Patented May 26, 1953

2,640,075

UNITED STATES PATENT OFFICE 2,640,075

MANUFACTURE OF POLYCARBOXYLIC ACIDS

Martinus L. Goedkoop, Geleen, Netherlands, assignor to De Directie van de Staatsmijnen in Limburg, handelend voor en namens de Staat der Nederlanden, Heerlen, Netherlands No Drawing. Application March 26, 1951, Serial No. 217,679. In the Netherlands April 1, 1950

3 Claims. (Cl. 260—515)

This invention relates to the manufacture of polycarboxylic acids and, more particularly, to the manufacture of oxidation products containing mellitic acid (benzene hexacarboxylic acid) from coke by oxidation with nitric acid and to the manufacture of pyromellitic acid (1-, 2-, 4- and 5-benzene tetracarboxylic acid) from these oxidation products.

Field of invention

It is known that when carbonaceous materials are oxidized with nitric acid, oxidation products can be obtained therefrom which contain benzene polycarboxylic acids. When anthracite or coke is used in this operation as the initial material, the benzene polycarboxylic acids chiefly is mellitic acid from which pyromellitic acid or its anhyride can be prepared by heating.

In U. S. patent application No. 182,143, filed August 29, 1950, now U. S. Patent No. 2,576,020, by J. Knops, a process has been described for manufacturing pyromellitic acid by heating the higher polycarboxylic acids in a fluidized state by means of water vapor with the initial material subdivided, preferably by being fixed to a fine-grained, porous carrier. When coke breeze is used in this operation as the carrier, a mixture of coke and carbonizable substance is left as a fluidization residue. This solid residue from the heating operation in the past has been discarded as a useless by-product.

Objects

A principal object of this invention is the provision of new improvements in known methods for the manufacture of polycarboxylic acid, especially mellitic acid and pyromellitic acid by the oxidation of coke. Further objects include:

1. The provision of new steps in such procedures which make possible the savings of reacting materials.
2. The provision of improvements in such operations which make it possible to carry them out in a continuous cyclic manner.
3. The use of a new type of carbonaceous materials for oxidation to form aryl polycarboxylic acids which give high yields of desired products and, at the same time, utilizing a material which has been considered a waste product heretofore.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

General description

These objects are accomplished according to the present invention by a combination of procedural steps which include forming or otherwise providing a quantity of an aryl polycarboxylic acid, coating coke breeze with said acid mixture, heating the coated coke breeze in a stream of gas containing water vapor to a temperature between 250 and 400° C., recovering the solid residue which results from said heating operation after passage of the gas stream thereover, and then oxidizing said solid residue to form a mixture of aryl polycarboxylic acids containing mellitic acid, and recovering the mixture of acids from the oxidized solid residue.

In the preferred form of the new procedures, the water vapor-containing gas stream is passed about the coated coke breeze at such a velocity that the solid particles become fluidized in the gas stream, the gas stream coming off of the solid particles is treated to condense water vapor therefrom and pyromellitic acid is recovered from the condensate, and the oxidation of the solid residue resulting from the heating operation is accomplished by mixing the solid residue with nitric acid and heating the mixture.

Example

The invention is further explained in the following example of actual operation in accordance with the invention.

To a hot solution of polycarboxylic acids which contains about 150 g. of these acids per litre, said solution having been obtained by oxidizing coke breeze with nitric acid, coke breeze (grain size 0.1–1.5 mm.) is added in an amount of 850 g. per litre. The mixture is subsequently dried and introduced into a fluidizing apparatus. The fluidization is carried out at a temperature of 280 to 290° C. by means of preheated steam. The pyromellitic acid is entrained by the water vapor escaping from the fluidizing apparatus. The condensate is cooled and acidulated with hydrochloric acid as a result of which an almost white precipitate of raw pyromellitic acid is obtained. 150 g. raw polycarboxylic acids give a yield of 63 g. pyromellitic acid.

The fluidization residue which, in addition to coke, still contains some acidic materials, is transferred to an oxidation reactor and oxidized by heating with nitric acid. A reaction product is formed which yields, by filtration, a solution of polycarboxylic acids which is subsequently treated in the manner described above.

Detailed description

The aryl polycarboxylic acid mixture referred to above can consist almost wholly of mellitic acid or may contain larger proportions of other acids in addition to mellitic acid. After the solution obtained by oxidation with nitric acid is freed of undissolved components, the coke breeze is added to the solution and the mixture is then dried by vaporization.

The resulting coated coke breeze can be heated to the necessary temperature of 250° to 400° C. in a variety of ways. For example, it can be charged into a rotary, inclined, cylindrical reactor and heated by passing the water-vapor-containing gas stream over the coated particles, while they are agitated by rotation of the vessel. Preferably, however, the coated particles are charged into a vertical, cylindrical container or the equivalent thereof, and the gas stream passed upwardly through the contained particles at such a velocity that the particles become fluidized therein. In such a case, the gas stream is preheated to the temperature necessary to raise the particles within the temperature range specified.

The gas stream which issues from the heated particles of coated coke breeze can be handled in a variety of ways, but preferably, is treated for the recovery of pyromellitic acid. This is most easily accomplished by condensing the water vapor in the gas stream, e. g., by cooling and then recovering the pyromellitic acid from the condensed water.

The time of passage of the heated gas stream over the coated particles is not critical and will depend to some extent upon the nature of the coating and the amount of coating relative to the coke breeze. For most efficient operation, this gas passage and heating operation should be conducted until the quantity of pyromellitic acid, issuing with the water vapor in the gas stream, is too low for practical continuation of the operation. When a batch-type procedure is employed, the solid residue at this point is removed and transferred to the next stage in the process, namely, oxidation to form a mixture of aryl polycarboxylic acids. While this oxidation can be accomplished in a variety of ways, it is preferably accomplished by mixing the solid residue with nitric acid and then heating, such as to the boiling point, to oxidize the solid material to form a solution of aryl polycarboxylic acids which will contain a large percentage of mellitic acid.

The coke breeze can be advantageously used in the same form in which it is obtained in normal commercial operation. On the other hand, if desired, the coke breeze may be further treated so as to obtain a very uniform particle size which, preferably, is between 0.1 and 2 mm.

The coating of the coke breeze with the mixture of polycarboxylic acid or mellitic acid can be accomplished in any desired fashion. Advantageously, the coke breeze is coated by mixing it with the solution of polycarboxylic acids resulting from the nitric acid oxidation and evaporating the mixture to form a solid subdivided material. On the other hand, the acid mixture can be concentrated to a molten state and the coke breeze mixed with the melt. The impregnated coke breeze need not be thoroughly dried since it may be used in the heating step in a humid condition.

The proportion of coke breeze to acid mixture used in forming the coated particles is not critical and may be varied to accommodate the characteristics of the acid mixture or the treating apparatus. However, for most operation and, particularly, when fluidization is employed, the coke breeze should be between 1 and 3 times by weight of the polycarboxylic acid mixture.

Conclusions

The invention, as described above, provides certain new improvements in the generally known method of forming mellitic acid and pyromellitic acid or its anhydrate from solid carbonaceous material. By using these new improvements, a high efficiency of operation is obtained because of full utilization of all reacting materials and elimination of useless by-products. At the same time, the new improvements make it possible to carry out a completely continuous operation in which reactants from one stage are passed continuously to a subsequent stage.

I claim:

1. A process for the manufacture of polycarboxylic acids which comprises providing a quantity of an aryl polycarboxylic acid mixture containing mellitic acid obtained by oxidation of coke, coating coke breeze with said acid mixture, heating the coated coke breeze in a gas stream containing water vapor to between 250° and 400° C. whereupon the mellitic acid in said mixture is converted to pyromellitic acid, the latter being volatilized by said gas stream and recovered therefrom, recovering the solid residue comprising coke breeze and residual products derived from said acid mixture, from said heating operation, oxidizing said solid residue and recovering a mixture of polycarboxylic acids containing mellitic acid therefrom, and thereafter utilizing the recovered acid mixture for coating said coke breeze.

2. A process for the manufacture of mellitic acid and pyromellitic acid which comprises forming a mixture of aryl polycarboxylic acids containing mellitic acid by oxidation of coke, coating coke breeze with said mixture, fluidizing said coated coke breeze in a water vapor containing gas stream, heating the coated material to a temperature of between 250° and 400° C. while fluidized in said gas stream, condensing water vapor from said gas stream subsequent to separation from the coated material and recovering pyromellitic acid therefrom, recovering the solid residue from said heating operation, said residue comprising coke breeze and residual products derived from the acid mixture undergoing treatment, mixing said residue with nitric acid, heating the resulting acid mixture to oxidize said solid residue including the residual products included therein to obtain a solution of polycarboxylic acids containing mellitic acid from said heated reaction mixture and utilizing the thus obtained polycarboxylic acids for coating said coke breeze.

3. A process as claimed in claim 1 wherein the coke breeze is between 1 and 3 times by weight of said polycarboxylic acid mixture with which it is coated.

MARTINUS L. GOEDKOOP.

References Cited in the file of this patent
UNITED STATES PATENTS

| Number | Name | Date |
|---|---|---|
| 1,332,028 | Coblentz et al. | Feb. 24, 1920 |
| 2,176,348 | Juettner | Oct. 17, 1939 |
| 2,461,740 | Kiebler | Feb. 15, 1949 |
| 2,555,410 | Howard | June 5, 1951 |
| 2,576,020 | Knops | Nov. 20, 1951 |

FOREIGN PATENTS

| Number | Country | Date |
|---|---|---|
| 24,662 | Great Britain | of 1907 |
| 441,432 | Germany | Mar. 4, 1927 |
| 879,182 | France | Feb. 16, 1943 |